March 2, 1971 B. B. EVANS 3,567,255

QUICK ACTING FLUID COUPLING

Filed Nov. 21, 1968 3 Sheets-Sheet 1

INVENTOR.

Bryce B. Evans

BY Jerry K Harness his ATTORNEY.

March 2, 1971 B. B. EVANS 3,567,255

QUICK ACTING FLUID COUPLING

Filed Nov. 21, 1968 3 Sheets-Sheet 2

INVENTOR.

BY Bryce B. Evans

Jerry K Harness his ATTORNEY.

QUICK ACTING FLUID COUPLING

INVENTOR.

Bryce B. Evans

BY Jerry K Harness his ATTORNEY.

United States Patent Office 3,567,255
Patented Mar. 2, 1971

3,567,255
QUICK ACTING FLUID COUPLING
Bryce B. Evans, Jackson, Mich., assignor to Aeroquip Corporation, Jackson, Mich.
Filed Nov. 21, 1968, Ser. No. 777,660
Int. Cl. F16l 37/22, 37/28
U.S. Cl. 285—1 1 Claim

ABSTRACT OF THE DISCLOSURE

A fluid coupling having interfitting male and female bodies. The female body carries radially movable detents to lock the male body in position, the detents being held inwardly by sleeve means. Both bodies have spring-pressed fluid retaining valves which are opened when the bodies interfit but close when they are disconnected. The female body has an outer fixed section connected to the sleeve means and an inner movable section which carries the detents. The outer section is connected by a rigid conduit to the fluid line. To disconnect the coupling, the male body and inner section of the female body are moved with respect to the outer section and sleeve means until the detents are freed. In one embodiment, the sleeve means is manually retractable to release the detents for connecting or disconnecting the bodies. In the second embodiment, the sleeve means is part of the outer female body section, and an annular overcenter spring maintains the two sections of the female body either in a detent locking position or in a position with the detents freed, so that it is unnecessary to manually retract the sleeve means in order to reconnect the bodies.

BACKGROUND OF THE INVENTION

(1) Field of the invention

The invention relates to quick acting fluid couplings usable, for example, between a tractor and a trailer, or implement, in which one body of the coupling will break away from the other by a mere pulling action.

(2) Description of the prior art

Such couplings conventionally have interfitting male and female bodies and if the couplings are to connect a tractor and a trailer, or implement, the male body will normally be carried by the implement and the female body to the tractor. The female body carries radially movable detents which are controlled by a spring-pressed retractable sleeve on the female body. In order to permit the break-away action, the sleeve is fixed to the tractor and the female body is connected to the fluid line by a flexible hose so that when the implement is unhitched and the sleeve is pulled by the tractor, the bodies can slide rearwardly with respect to the sleeve until the detents are released. Since they are repeatedly subjected to twisting, bending and pulling forces, the hose and its associated fittings receive much wear and present a constant maintenance problem.

SUMMARY OF THE INVENTION

According to the illustrated embodiment of the invention, the female body is constructed of an outer section and an inner section, the outer section rather than the sleeve means being fixed to the tractor. The inner section carries the detents and is slidable within the outer section, the sleeve means being slidable on the inner section but being connected with the outer section. Thus, when the outer section is pulled forwardly or the male body pulled rearwardly, the outer section and sleeve means will slide relative to the inner member and male body, freeing the detents so that the male body may be released. Since the outer section of the female body is fixed to the tractor it may be connected to the fluid line by a rigid conduit rather than a flexible hose, providing a permanent maintenance-free connection.

The inner and outer sections are connected by an annular seal, and in order to counteract the fluid pressure on this seal, a chamber is provided between the inner and outer sections, this chamber being formed by a pair of seals having a differential pressure area counteracting the force on the first-mentioned seal.

In the illustrated embodiments of the invention, both the male and female bodies have spring-pressed fluid retaining valves which are closed when the bodies are disconnected but open upon connection of the bodies. In one illustrated embodiment of the invention, the sleeve is separate from the outer section but has a one-way connection therewith and is spring-urged toward its locking position, being manually retractable. In a second illustrated embodiment, the separate spring-pressed sleeve is replaced by a portion of the outer section forming the locking sleeve for the detents. In this embodiment, an overcenter spring connection is provided between the inner and outer sections of the female body. Thus, pulling of the male body and outer female body section relative to each other will not only result in release of the detents, but will throw the overcenter spring so that the inner and outer sections will remain in the detent-release position. The coupling may be reconnected simply by inserting the male body into the inner section of the female body and pushing until the overcenter spring is thrown back to its original position.

DESCRIPTION OF THE PREFERRED EMBODIMENTS

Figure 1:
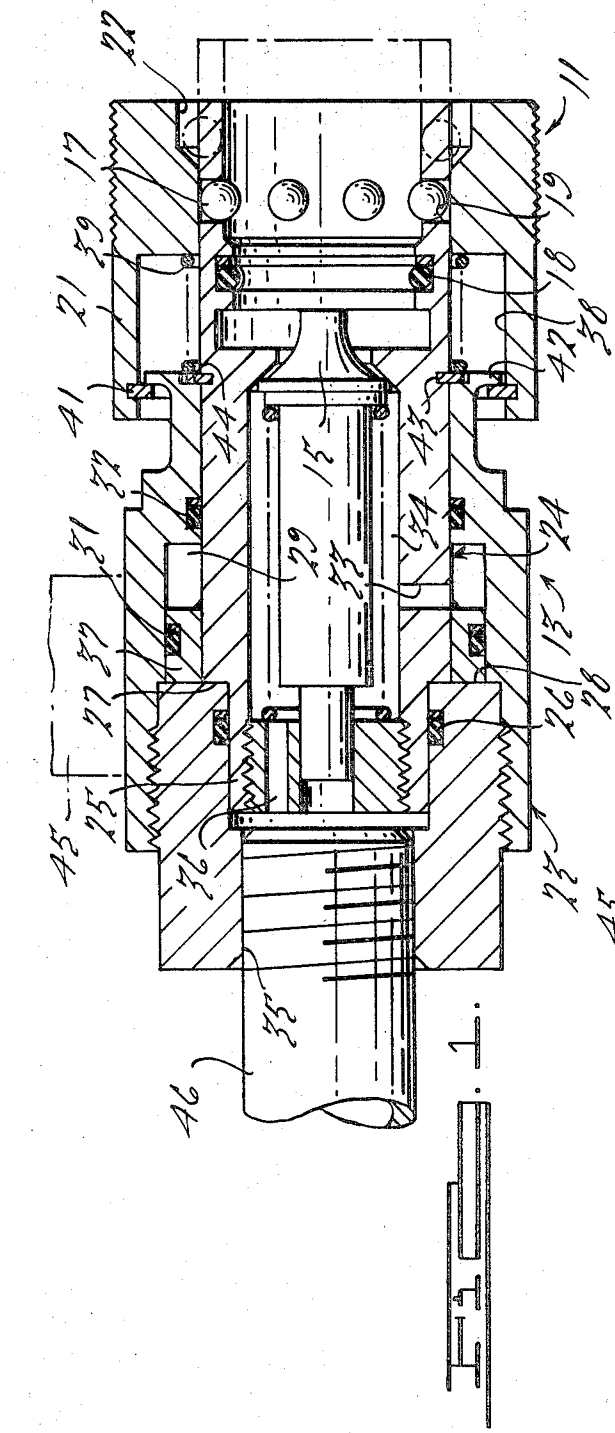
FIG. 1 is a cross-sectional view in elevation of the female coupling body of one embodiment of the invention, showing its connection to the fixed mount as well as the fluid line, the body being shown with the male body disconnected.
Figure 2:
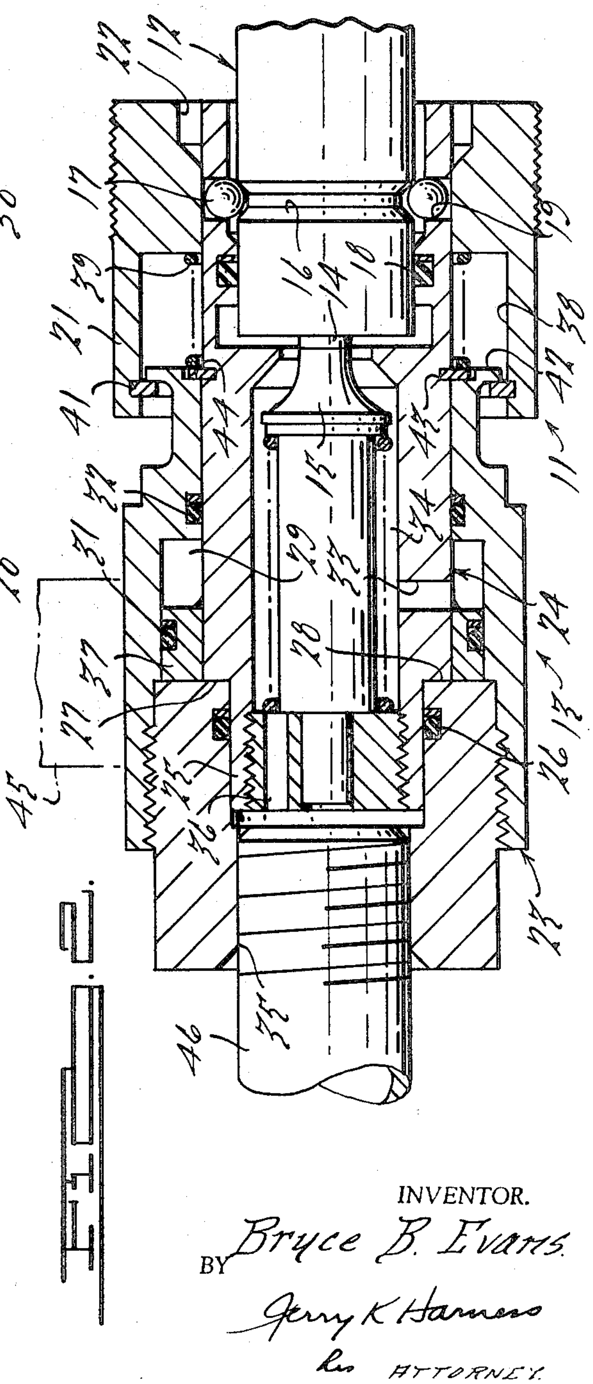
FIG. 2 is a view similar to but showing the parts with the male body connected to the female body.
Figures 3, 4:
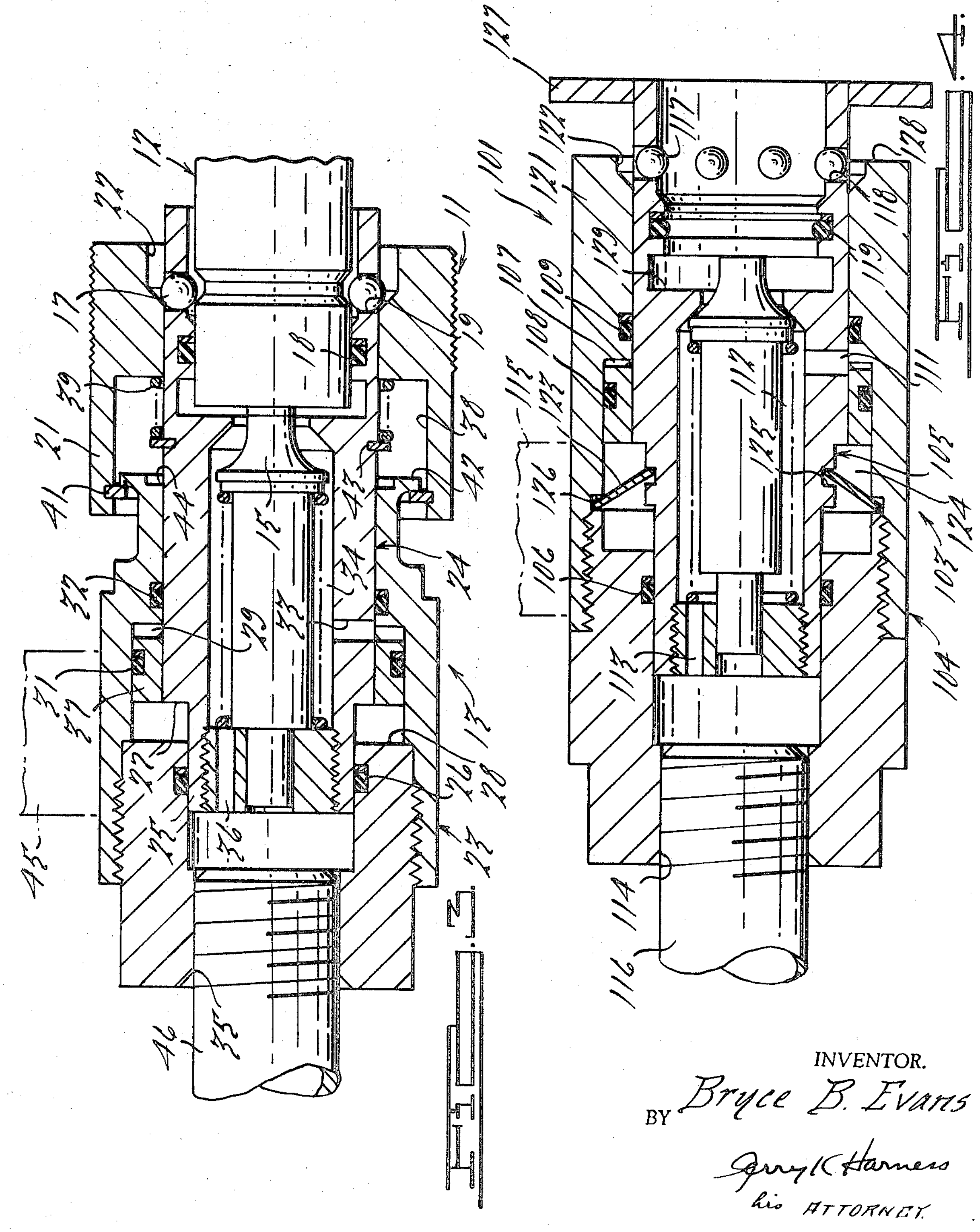
FIG. 3 is a view similar to FIG. 2 but showing the bodies pulled toward their disconnected position.
FIG. 4 is a cross-sectional view in elevation of the female body of another embodiment of the invention, the parts being shown in a position ready to receive the male body.

Referring first to the embodiment of FIGS. 1 to 3, the coupling is generally indicated at 11 and comprises a male body generally indicated at 12 and a female body generally indicated at 13. These bodies are of generally tubular shape, and have spring-pressed fluid retaining valves 14 and 15 respectively, which are normally closed, but which open when male body 12 is inserted in female body 13.

Male body 12 has an annular groove 16 which receives a plurality of circumferentially spaced spherical detents 17 when in its fully inserted position. These detents are carried by female body 13 and are radially movable between retracted and locking positions. An annular seal 18 carried by female body 13 engages male body 12 when the latter is inserted.

Detents 17 are mounted in radially extending slots 19 of female body 13 and are controlled by a sleeve 21. This sleeve has a locking position shown in FIG. 2 in which detents 17 are held in their locking position within groove 16, and a retracted position shown in FIG. 3 in which a widened portion 22 of the sleeve interior is opposite the detents so that they may be moved outwardly to release the male body.

According to the invention, female body 13 is composed of two sections, an outer section generally indicated at 23 and an inner section generally indicated at 24. These two sections are in telescoping relation, section 24 having a relatively narrow portion 25 at its left-hand end as seen in FIG. 1 engaging a seal 26 carried within the bore of section 23. Opposing shoulders 27 and 28 on sections 23 and 24 respectively limit leftward movement of section 24 with respect to section 23. A chamber 29 is formed between the two sections, this chamber being bounded by a seal 31 of relatively large diameter carried by section 24, and a seal 32 carried by section 23. The chamber 29 along with seals 31 and 32 serve as a conventional pressure balancing arrangement. It will be appreciated that the pressure within the system exerted against the seal 26 would tend to maintain the inner section 24 in the position shown by the dotted lines in FIG. 1. The pressure build-up within the chamber 29 counteracts this pressure to balance the system so that the spring 39 can control the connection and disconnection of the coupling halves. This type of pressure balancing system is shown in applicant's assignee expired Pat. No. 2,463,326. A plurality of circumferentially spaced radial passages 33 connect chamber 29 with the chamber 34 within section 24. This chamber is connected with port 35 to the left of seal 26 by passages 36 through bearing 37 which slidably supports valve 15. Thus, when inner section 24 slides to the right with respect to section 23, that is, from the FIG. 2 to the FIG. 3 position, fluid in chamber 29 will flow through passages 33, chamber 34 and passages 36 into the space connected to port 35.

The bore of sleeve 21 has an enlarged portion 38 which encloses a helical coil compression spring 39. One end of this spring engages sleeve 21, thus urging the sleeve to its locking position. A stop 41 in the form of a snap ring is carried by the left-hand end of sleeve 21 and engages a flange 42 on outer body section 23 to limit the movement of sleeve 21 in a rightward direction. A shoulder 43 in the form of a snap ring carried by section 24 supports the other end of spring 39, and a clearance recess 44 (FIG. 3) at the right hand end of section 23 is provided for this snap ring. Upon rightward movement of section 24 with respect to section 23 from the FIG. 2 to the FIG. 3 position, spring 39 will be compressed. However, sleeve 21 will not move to the right since it is held by shoulder 42 engaging snap ring 41.

When installed, section 23 will be secured to a fixed support 45 such as a rear cross frame member of a tractor. Port 35 is connected to a fluid line by a rigid tube or fitting 46, no flexible connections being required.

In operation, with the parts initially in the FIG. 1 position, assume that it is desired to connect male body 12 to female body 13. Sleeve 21 will be manually retracted against the action of spring 39 so that insertion of body 12 will force detents 17 outwardly until male body 12 is fully within the female body as seen in FIG. 2. When in this position, release of sleeve 21 will cause detents 17 to enter locking groove 16. Fluid retaining valves 14 and 15 will be opened by insertion of the male body so that the coupling will be effected.

Disconnection of the two bodies may be accomplished either by pulling male body 12 rightwardly along with inner female body section 24, or by pulling leftwardly on outer female body section 23. The latter event may occur, for example, if an implement or trailer being towed is disconnected from the tractor which continues to move leftwardly. This will pull section 23 and sleeve 21 against spring 39. Inner section 24 and male body 12 will then slide rightwardly from the FIG. 2 to the FIG. 3 position with respect to outer section 23 and sleeve 21. Fluid will flow from chamber 29 through passages 33, chamber 34 and passages 36 to port 35 during this movement. When section 24 is moved far enough to bring detents 17 to space 22 of sleeve 21, male body 12 will be released and disconnected from the female body, valves 14 and 15 being closed. Spring 39 will then drive section 24 back to its FIG. 1 position, the fluid flow being in the opposite direction, namely, from port 35 to chamber 29.

Figure 5:
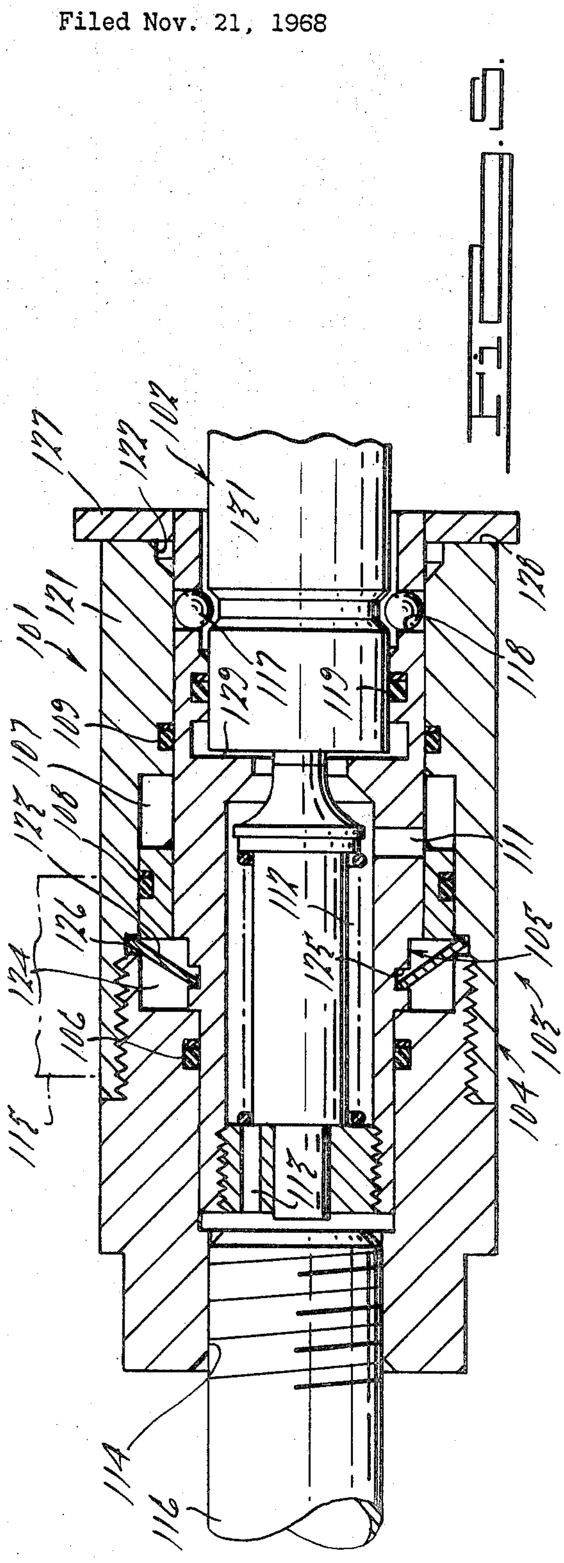
FIG. 5 is a view similar to FIG. 4, showing the male body connected to the female body.
Figure 6:
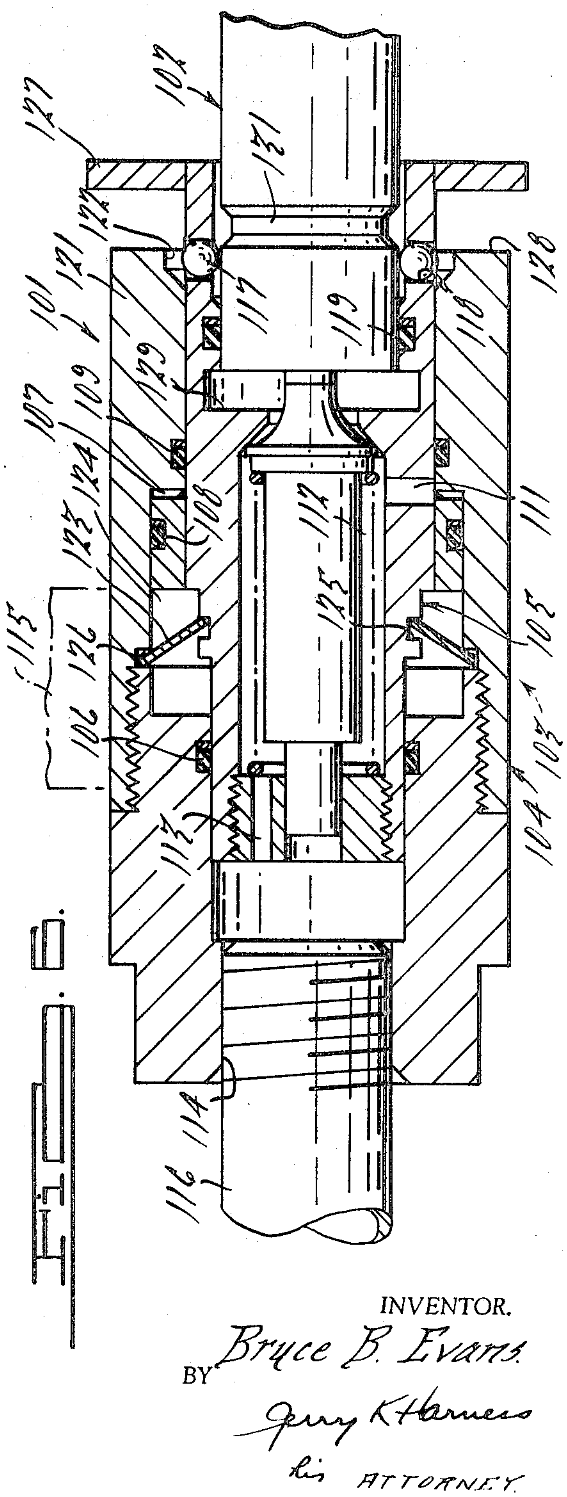
FIG. 6 is a view similar to FIG. 5, showing the bodies pulled toward their disconnected position.

FIGS. 4 to 6 show a second embodiment of the invention which differs from the previous embodiment in that a separate sleeve for locking the detents is eliminated, this function being performed by a portion of the outer female body section. Furthermore, the inner and outer sections of the female body are connected by an overcenter spring so that they will be held either in a male body locking position or a male body releasing position. This construction is disclosed and claimed in my copending application Ser. No. 781,869 filed Dec. 6, 1968 and entitled Quick Acting Coupling, the two applications having a common assignee.

The coupling of FIGS. 4 to 6 is generally indicated at 101 in FIG. 5 and comprises a male body generally indicated at 102 and a female body generally indicated at 103, these bodies having fluid retaining valves as in the previous embodiment. Female body 103 comprises an outer section generally indicated at 104 and an inner section generally indicated at 105. A seal 106 carried by section 104 engages section 105 and a chamber 107 is formed between the two sections, being bounded by seals 108 and 109 respectievly. The last two mentioned seals form a differential pressure area opposing the area formed by seal 106, as in the previous embodiment. A plurality of radial passages 111 lead from chamber 107 to chamber 112 of section 105, and passages 113 lead from chamber 112 to port 114. During rightward movement of section 105 with respect to section 104, fluid will thus flow from chamber 107 to port 114 as in the previous embodiment. Section 104 is secured to a fixed support member 115, such as a rear cross frame member of a tractor, and has a rigid tube or fitting 116 connected to port 114 and leading to the fluid line to form a permanent and immovable connection therewith.

A plurality of spherical detents 117 are carried by radial apertures 118 in the forward end of section 105, forwardly of a seal 119 which engages male body 102 when inserted in the female body. The position of detents 117 is controlled by a sleeve portion 121 of outer member 104. The sleeve portion extends to the right of seal 109 and surrounds detents 117, having a sliding fit with inner section 105 and having an enlarged portion 122. When section 105 is moved to the right with respect to section 104 as in FIG. 3, detents 117 will arrive at enlarged bore portion 122, permitting the detents to be moved outwardly so that male body 102 may be moved into or out of the female body section 105.

A frustoconical overcenter spring steel washer 123, commonly known as a Belleville washer, is disposed within a chamber 124 formed between sections 104, and 105. The inner edge of this washer is disposed within a groove 125 on section 105 and the outer edge within a groove 126 on the interior of member 104. While in the FIG. 4 position, washer 123 will urge section 105 to the left with respect to section 104, this movement being limited by a flange 127 secured to the right hand end of section 105 and engaging the end 128 of section 104.

In operation of the embodiment of FIGS. 4 to 6, assuming an initial position as shown in FIG. 4, the coupling may be connected by inserting male body 102 into female body section 105 and pressing inwardly until spring 123 snaps over center. No manual engagement of a sleeve on the female body is necessary. The initial pressure against female body section 105 will be on shoulder 129 which surrounds valve 105, but as detents 117 enter the bore of sleeve portion 121, they will be forced into locking groove 131 of the male body. During this movement, fluid will be forced from port 114 through passages 113, chamber 112 and passages 111 into chamber 107, the parts arriving at the position of FIG. 5.

To disconnect the coupling, a rightward pulling force on male body 102 will transmit force through detents 117 to section 105. Spring 123 will be snapped over center as inner section 105 moves rightwardly with respect to fixed section 104. During this movement fluid will flow from chamber 107 to port 114. The movement will continue until detents 117 reach enlarged bore portion 122 whereupon they will be released, permitting the male body 102 to be withdrawn. The female body will thus reach the FIG. 6 position and will remain in this position until male body 102 is again inserted. Disconnection could also be accomplished by the tractor pulling leftwardly on outer section 104, as previously described with respect to FIGS. 1 to 3.

It will thus be seen that a novel and improved fluid coupling construction has been provided which permits the female body to be connected to the fluid line by a rigid tube or fitting, without the necessity of a flexible hose and the accompanying connecting parts.

What is claimed is:

1. A fluid coupling comprising a female member and a male member insertable into said female member to effect interconnection therewith, said male member having a detent receiving recess for effecting a locking connection between said members, said female member comprising an outer section and an inner section slidable therein and having a portion thereof extending outwardly of said outer member, first abutment means carried by said inner section engageable with said outer section to limit the movement of said inner section inwardly of said outer section, detent means carried by said inner section and being radially movable into and out of the recess in said male member to effect connection and disconnection of said coupling members, respectively, a sleeve slidably positioned around the extending portion of said inner section, said sleeve having a first generally cylindrical inner surface egageable with said detent means to urge said detent means radially inwardly to effect and maintain said connection of said coupling members, said sleeve having a second inner surface of a larger diameter than and in communication with said first surface wherein sliding movement of said sleeve toward said outer section will align said second surface with said detent means to effect disconnection of said coupling members, second abutment means carried by said sleeve and engageable with said outer section to limit the movement of said sleeve in a direction away from said outer section, and compression spring means interposed between said sleeve and said first abutment means, said spring means resisting movement of said sleeve in a direction toward said outer section and resisting movement of said inner section in the opposite direction away from said outer section.

References Cited

UNITED STATES PATENTS

| | | | |
|---|---|---|---|
| 2,463,326 | 3/1949 | Smisko et al. | 285—1X |
| 3,140,102 | 7/1964 | Johnson | 285—1X |
| 3,279,827 | 10/1966 | Brown | 285—1 |

WILLIAM R. CLINE, Primary Examiner

U.S. Cl. X.R.

251—149.6; 285—277